US006922399B1

(12) United States Patent
Dirkmann et al.

(10) Patent No.: US 6,922,399 B1
(45) Date of Patent: Jul. 26, 2005

(54) METHOD OF HANDLING SERVICE CONNECTIONS IN A COMMUNICATION NETWORK

(75) Inventors: Ansgar Dirkmann, München (DE); Thomas Werner, München (DE); Jan Hamann, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/284,581

(22) PCT Filed: Oct. 7, 1997

(86) PCT No.: PCT/EP97/05498

§ 371 (c)(1),
(2), (4) Date: Apr. 15, 1999

(87) PCT Pub. No.: WO98/17079

PCT Pub. Date: Apr. 23, 1998

(30) Foreign Application Priority Data

Oct. 15, 1996 (DE) .......................................... 96116505

(51) Int. Cl.[7] .............................................. H04L 12/16
(52) U.S. Cl. .................... 370/264; 370/395.2; 370/410; 370/426; 370/496; 370/524
(58) Field of Search ................................ 370/264, 410, 370/426, 496, 522, 524, 466, 352–356, 389, 401, 395.2, 395.3

(56) References Cited

U.S. PATENT DOCUMENTS

| | | | | |
|---|---|---|---|---|
| 5,473,679 A | * | 12/1995 | La Porta et al. ............ 370/410 |
| 5,483,527 A | * | 1/1996 | Doshi et al. ................ 370/399 |
| 5,917,624 A | * | 6/1999 | Wagner ........................ 398/71 |
| 6,115,380 A | * | 9/2000 | Christie et al. ............. 370/270 |
| 6,298,064 B1 | * | 10/2001 | Christie ....................... 370/410 |
| 6,452,925 B1 | * | 9/2002 | Sistanizadeh et al. ....... 370/352 |

OTHER PUBLICATIONS

Internet access via Baseband and nroadband ISDN Gateways, published Apr. 12–15, 1994, Phoenix, Jay Tao and Ralph Martinez.*
Japanese Abstract, 04098345, Mar. 31, 1992.
Japanese Abstract, 06343073, Dec. 13, 1994.
Japanese Abstract, 04035440, Feb. 6, 1992.
Japanese Abstract, 05207070, Aug. 13, 1993.
Japanese Abstract, 05236165, Sep. 10, 1993.
Bocker, "ISDN Das diensteintegrierende digitale Nachrichtennetz", Springer–Verlag Berlin Heidelberg, pp. 82–86.
Tao et al., "Internet Access via Baseband and Broadband ISDN Gateways", Proceedings of the Thirteenth Annual Intl., Phoenix Conference on Computers and Communications, pp. 485–490.

* cited by examiner

*Primary Examiner*—Inder P. Mehra
(74) *Attorney, Agent, or Firm*—Aslan Baghdadi; Shaw Pittman LLP

(57) ABSTRACT

A method for controlling connections in a communication network including setting up a signaling connection between a subscriber of the communication network and a service access system based on a service connection request by the subscriber; and setting up a payload connection associated with the signaling connection only between the service access system and the subscriber given data traffic for the service and clearing down the payload connection after the data transmission.

12 Claims, 6 Drawing Sheets

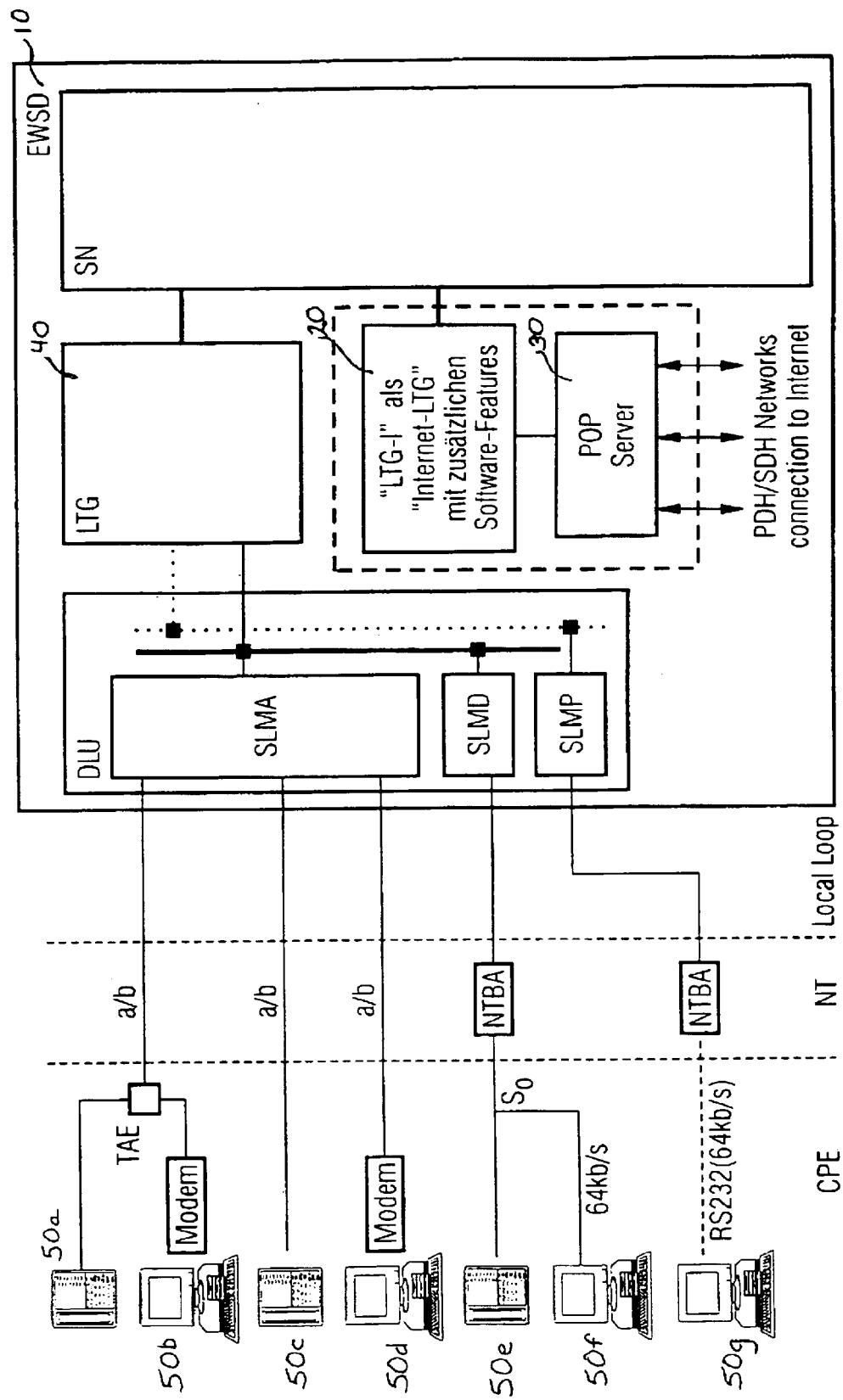

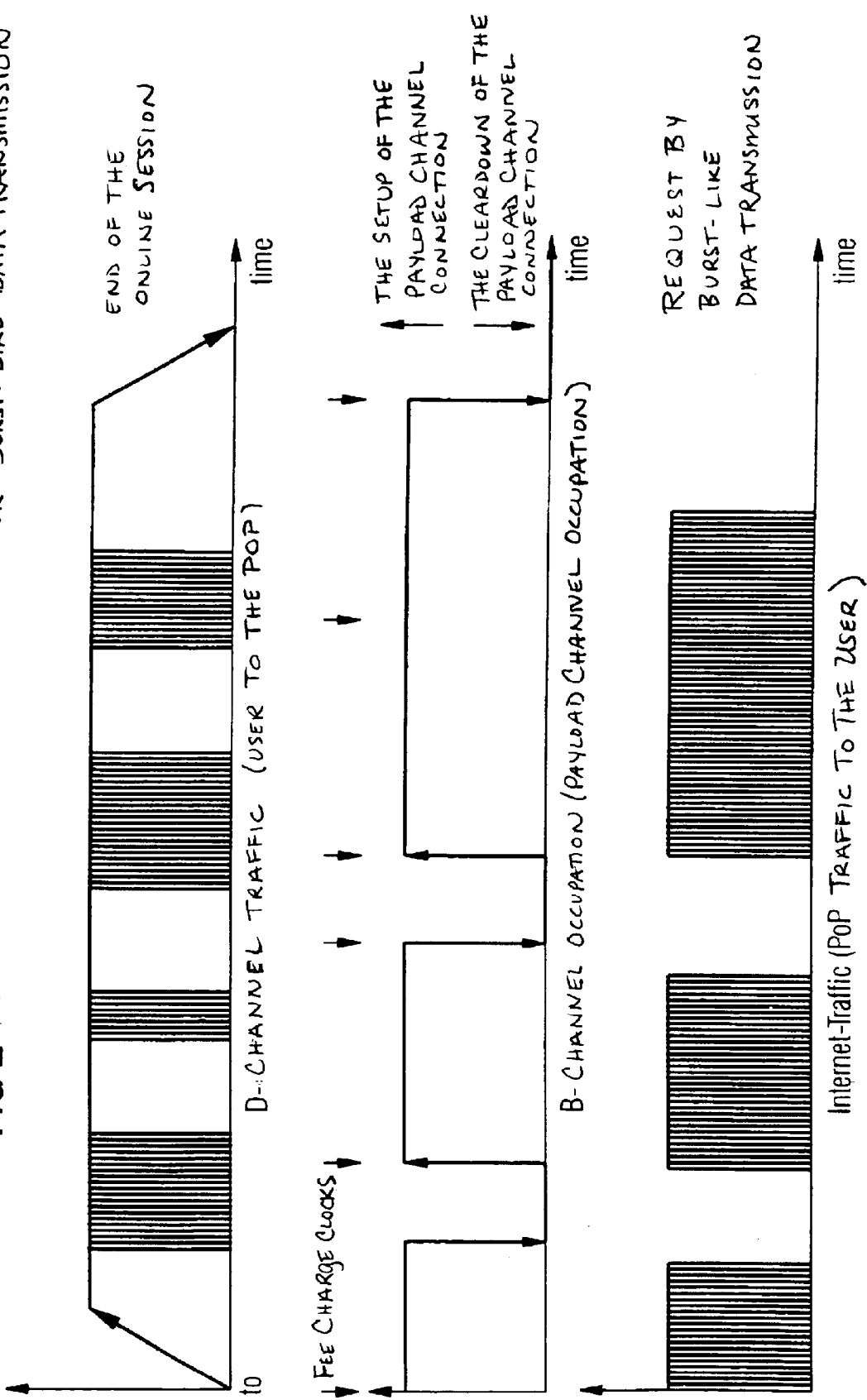

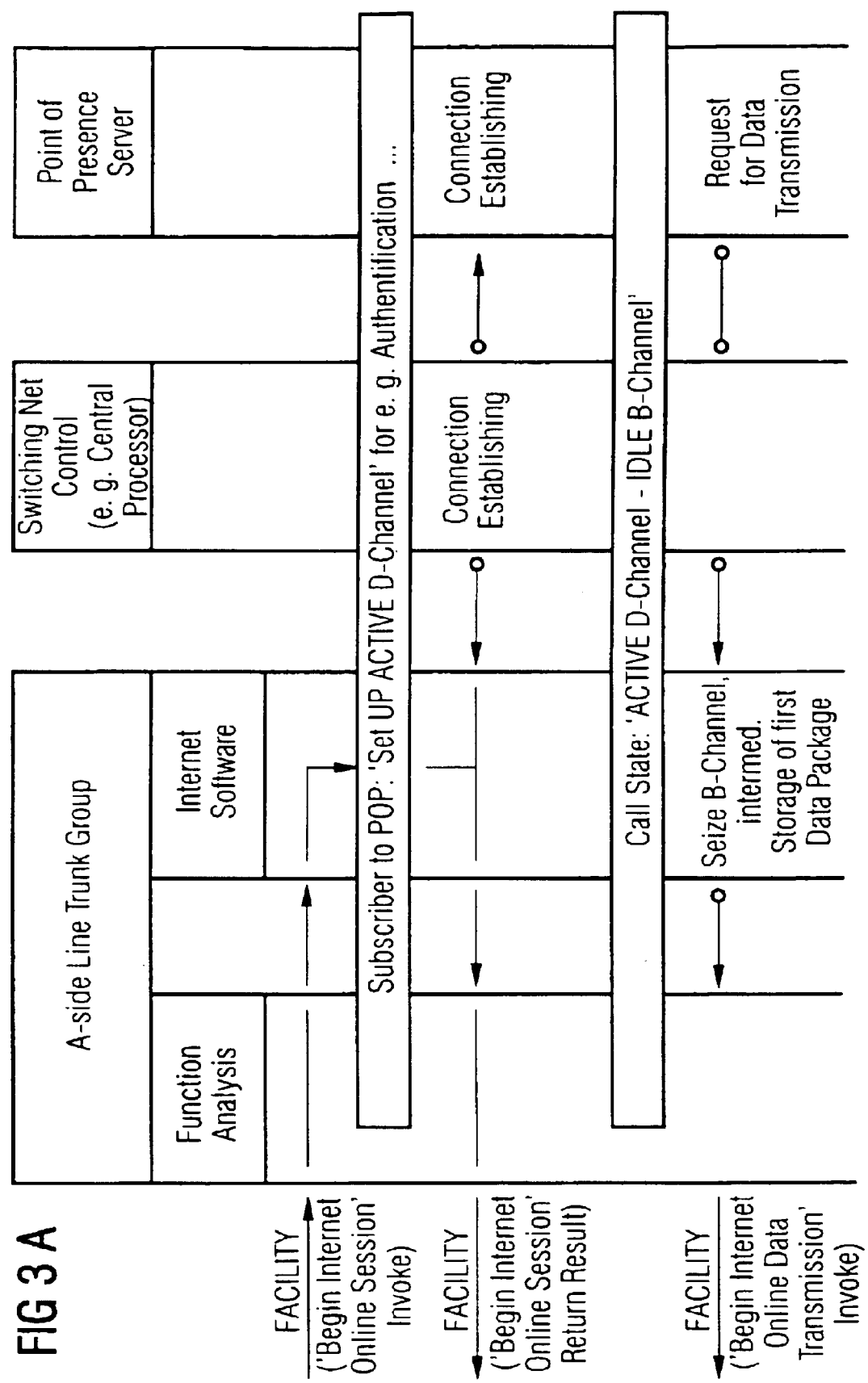

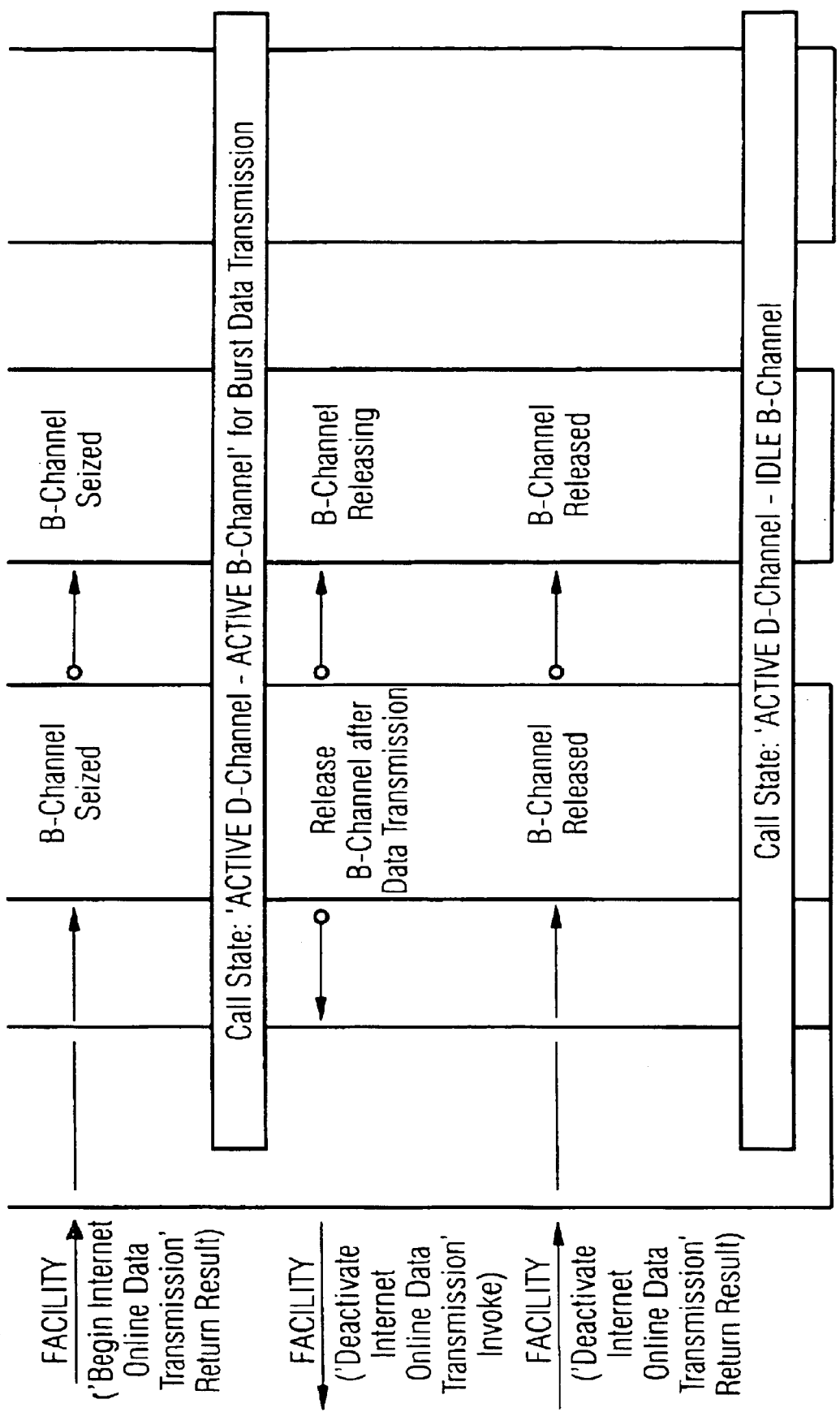

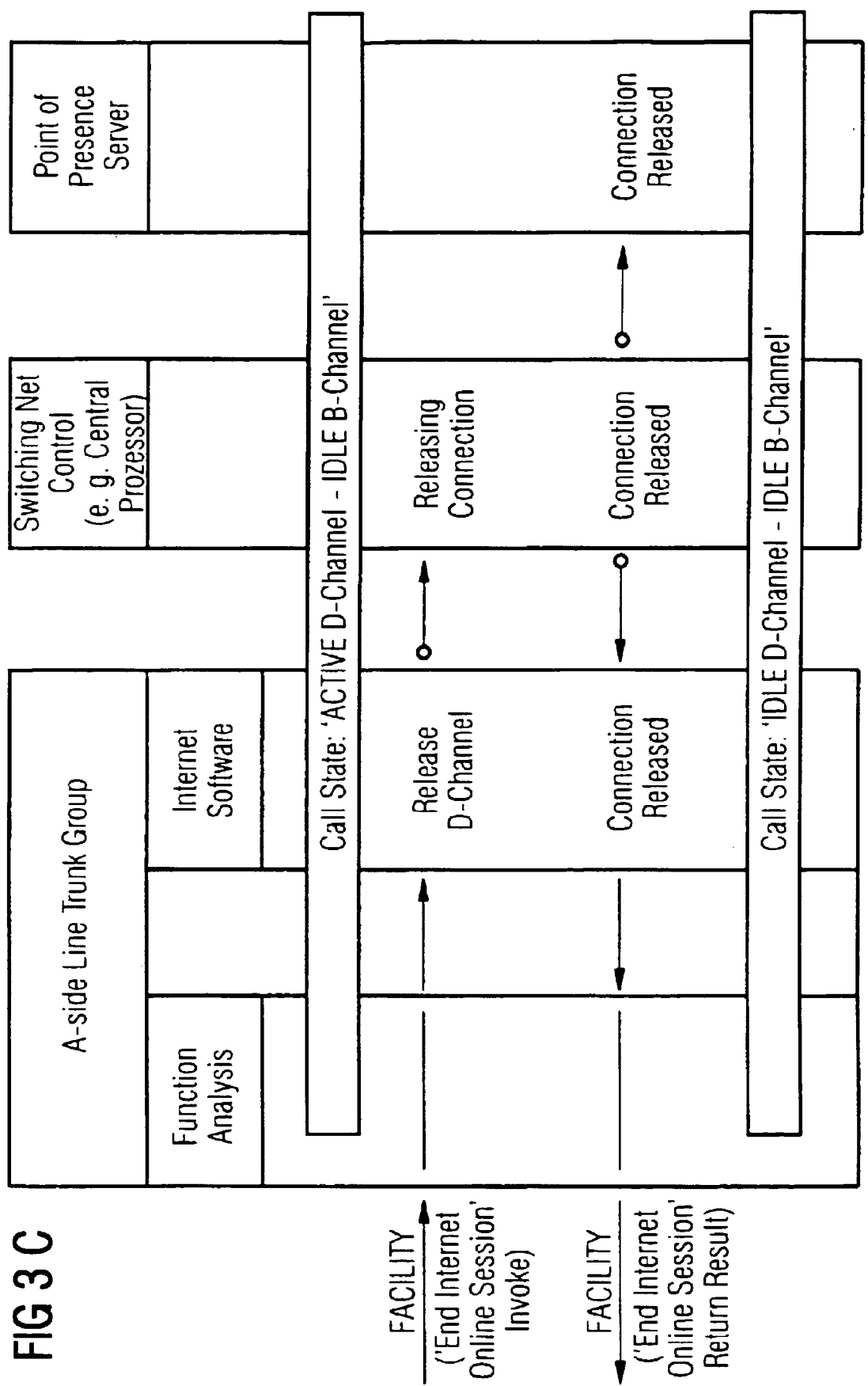

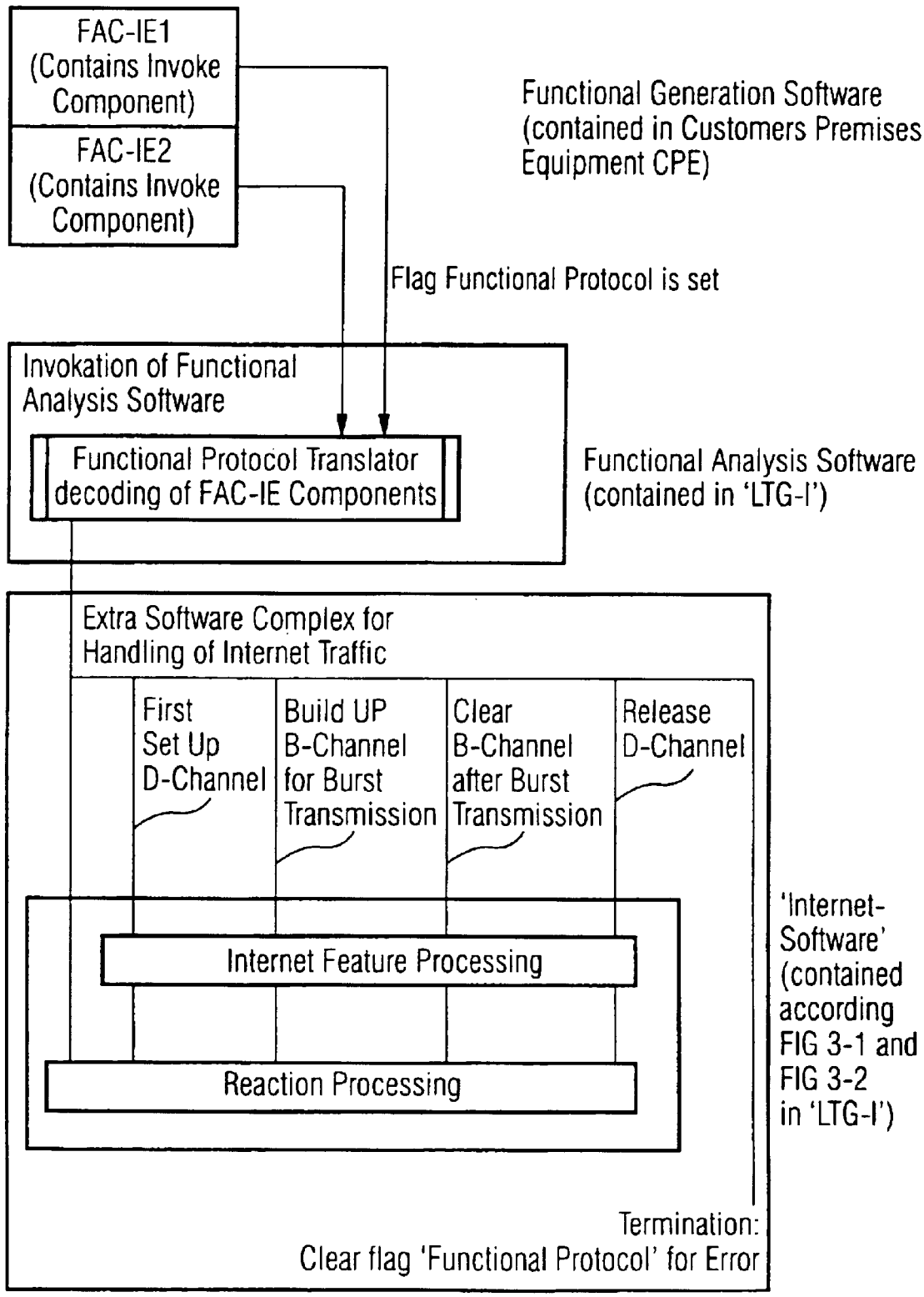
FIG 4 SCHEMATIC ILLUSTRATION OF THE PROCESSING BY THE SOFTWARE OF THE SWITCHING CENTER

METHOD OF HANDLING SERVICE CONNECTIONS IN A COMMUNICATION NETWORK

BACKGROUND OF THE INVENTION

1. Field of the Invention

The invention relates to a communication network and the handling of service connections in the communication network including an Internet access system and a switching center.

2. Description of Related Art

A strong growth of the traffic volume in the access area to services that are offered by other networks, for example the Internet, is connected with the strong growth of Internet services and other special services. As a result, there is a substantial increase in the demands made of the exchanges forming the access area to these networks.

The situation is additionally intensified in that current exchanges are not dimensioned for the absolute call lengths and distributions of call lengths that mainly occur in the Internet traffic, to the entry nodes of the Internet service providers. Even when there is a slight increase in Internet traffic volume, additional exertions of the Internet access service operators are needed for expanding the capacity of their switching centers in order to maintain the actual voice traffic with the required quality features.

SUMMARY OF THE INVENTION

The invention is based on the object of placing network operators in the position of governing the increasing access traffic to the entry nodes for special services, particularly for example Internet services, without an involved expansion of the switching centers.

The object is achieved by to a method and system for controlling connections in a communication network that includes setting up a signaling connection between a subscriber of the communication network and a service access system based on a service connection request by the subscriber and setting up a payload connection associated with the signaling connection between the service access system and the subscriber only given data traffic for a service and clearing down the payload connection after the data transmission.

Another object of the invention provides a service that is a voice service and/or a data service.

A further object of the invention provides charging a service by the communication network for a time interval in which the signaling connection and the payload connection simultaneously exist for the service.

Another object of the invention provides a method in which the step of clearing down the payload connection does not occur immediately after the end of data transmission but occurs immediately before the expiration of the time interval already charged.

As object is achieved by the subject matters of claim 1 or 5.

It is already known (see e.g., Jay Tao et al., "Internet Access via Baseband and Broadband ISDN Gateways", Proceedings of the Thirteenth Annual International Phoenix Conference on Computers and Communications, 12–15 Apr. 1994, Phoenix, USA, pages 485–490) to check in an Internet access system connected to a switching center to see when an Internet connection is closed in order to subsequently initiate the cleardown of the (dialed) connection previously set up for the Internet connection as soon as possible. What is thereby proposed as an especially simple version of monitoring is a time-monitoring that monitors the Internet connection for inactivity. The time span monitored for inactivity, however, dare not be selected too short since the problem otherwise occurs that the (dialed) connection is cleared down even though the TCP connection was not yet closed.

Up to now, a dialed connection that was once set up was maintained during the entire duration of the connection to a special services provider in such a way that a payload channel is also occupied even in phases of the connection without data transmission. As a results, the above-described disadvantages arise for the operators of the switching centers, since current switching centers are not dimensioned for the absolute call lengths and call length distributions that mainly occur, in the Internet traffic to the entry nodes of the Internet service providers.

As a result of the inventive method, the load of the switching centers by special services access traffic is limited. To this end, the switching centers need not be dimensioned larger and/or expanded by the respective operator.

A further advantage of the invention is that the method provides designational control of the usage charges arising for the subscribers in the access network.

A further advantage of the invention includes offering features by the switching center in the data transmission pauses over what are then the free payload channels and/or over the still-occupied payload channel after the end of the burst-like data transmission in the time available up to the end of the time interval that has already been charged.

An exemplary embodiment of the invention is explained in greater detail below on the basis of the drawings.

DETAILED DESCRIPTION OF THE DRAWINGS

FIG. 1 is a schematic diagram of a switching center that links the access network to the Internet.

FIG. 2 shows three graphs illustrating the D-channel traffic, B-channel occupation and Internet traffic verses time.

FIG. 3A is a block diagram of a communication network incorporating principles of the invention.

FIG. 3B is a block diagram of a communication network incorporating principles of the invention.

FIG. 3C is a block diagram of a communication network incorporating principles of the invention.

FIG. 4 is a schematic diagram of the processing by the software of the switching center.

DETAILED DESCRIPTION OF THE PRESENTLY PREFERRED EMBODIMENTS

FIG. 1 shows an entry node, i.e., a switching center that links the access network to the Internet. The switching center contains, for example, a switching system of Siemens AG, namely the switching system EWSD 10. Said switching system is expanded by an Internet line/trunk group LTG-I 20 that can also contain POP functions in the illustrated case (POP server=point of presence server), but that comprises the interface to the POP server (for example, work station computer of the Sun company) in any case, whereby the POP server in turn comprises the PDH/SDH interfaces to the Internet. The terminal equipment CPE 50a–50g (referred to as customer premises equipment in English) that are connected to the switching center are thus connected to a switching center in the example of FIG. 1 that already represents the entry node into the Internet.

Due to the introduction of a specific service means LTG-I (Internet LTG), which is connected to the switching network SN of the switching system like every normal line/trunk group LTG 40 but comprises specific functions for the Internet traffic, the Internet traffic is separated from the ordinary traffic and is thus controlled by separate software. As a result thereof, undesired interactions with existing features of the switching center can be avoided.

To this end, a great increase in the complexity of the software in the switching center is avoided.

FIG. 2 shows the principle of the inventive method including the temporary setup and cleardown of the payload channel connection for burst-like data transmission.

Specifically, a user of an Internet service sets up a connection the POP server of the Internet service provider with the D-channel via the user's terminal equipment. As a result, the ISDN B-channels are not used.

After the connection is setup and authenticated the user delivers a request to the service provider for specific contents or services. The available bandwidth of the D-channel is adequate for these tasks.

The POP of the service provider recognizes the request and edits the data for transmission. Subsequently—controlled by the POP—, the B-channel connection to the user is set up and the requested data, for example files or home pages, are transmitted.

After successful transmission, the B-channel connection is maintained for the remaining running time of the charge interval that has already been paid and is cleared down before the next charge pulse is maintained for the duration of a predetermined time span.

After the user has processed the requested data, for example has read a requested home page, a new request can be delivered that results in a renewed setup and cleardown of a B-channel.

For clearing down the connection to the Internet service provider, a corresponding message is sent to the POP over the D-channel and the D-channel connection is subsequently cancelled.

FIGS. 3A–3C show schematic illustrations of the call flow for an Internet session for the case illustrated in FIG. 1, namely, the connection of the POP server (server of the Internet service provider) in the subscriber line switching center (In the illustrated call flow case, no use of the free B-channels ensues in the transmission pauses of the data transmission for offering info such as, charge information; otherwise, a corresponding message would be inserted into FIG. 3.

The executive sequence of an Internet online session is explained in greater detail below on the basis of the call flow according to FIGS. 3A–3C.

First, the Internet service request made via a corresponding terminal equipment is recognized in the line/trunk group LTG and a signaling connection, which is independent of the payload connection set up later (bearer independent), is set up via the signalling channel. The D-channel is thereby used as what is referred to as uplink for the signalling from the user to the switching center.

The connection setup occurs without occupying payload channels. The following advantages derive as a result thereof:

the traffic load of the switching center is limited;

no fixed signalling allocation is required, i.e. the message sequence and/or the sequence of the messages is not prescribed;

the facility messages (of a potentially proprietary functional protocol) can be sent in a loose sequence over the D-channel; and the switching-conditioned times, for example for entry and authentication procedures, can be intentionally differently charged/acquired (for example, free of charge) than the times for the actual data transmission since there is the possibility of handling this traffic controlled by separate software for Internet traffic. The times of the data transmission can in turn be charged differently than standard ISDN ("Integrated Service Digital Network") connections.

After the above connection, is setup, a payload channel is set up for the connection only given data traffic, namely in downlink direction, i.e. in the direction of the subscriber. The downlink setup of the payload channel is initiated by the POP server when the POP server is not integrated in a switching center of the access network. Otherwise, i.e. given integration of the POP server in a switching center, the setup is initiated by the switching center.

After the setup of a payload channel because of data traffic and a burstlike data transmission, a cleardown of the payload channel connection ensues given maintenance of the bearer-independent signalling relationship between the subscriber's terminal equipment and the switching center with the POP.

The following advantages derive since the payload channels are occupied only given traffic volume, i.e. only temporarily:

payload channels are only briefly occupied given data traffic that occurs burst-like (for example, Internet traffic, voice traffic, data traffic, fax traffic, electronic data exchange (electronic data interchange));

there is the possibility of utilizing the payload channels that are free in the data transmission pauses for the implementation of features by the switching center, potentially for the transmission of information offered by the VST such as, for example, charge information;

designational charging/acquisition of the times for making use of the access network for the data transmission since the charge for a payload connection is dependent on the duration in which the required payload channels are active.

The targeted charging represents a significant competitive advantage for the operator of the access network in an increasingly competitive situation with price wars for customers.

The charging is usually initiated and controlled by the call control. This control can stop or, interrupt the charging given release of the B-channel or channels, and can also restart it or, let it continue to run given renewed occupation/activation of the payload channels.

It is ideally cost-saving for the ultimate consumer/subscriber when the burst-like data transmission occurs within a charge interval (i.e., has ended no later than one second before the expiration of a charge interval,) so that the next charge interval does not start and, thus, charge units are no longer incurred at its beginning. This can be designationally controlled by software, for example given integration of the POP in the switching center. This method is cost-saving for all fee schedules that are not based on a to-the-second billing method. This cost saving includes the great majority of all charging methods applied worldwide.

A further advantage of the above-described method is the clean separation between times for the entry and authentication procedures conditioned in terms of switching technology, times without B-channel occupancy but with D-channel occupancy in an active connection as well as times for payload channel occupations. Particularly the times for the entry and authentication procedures, can largely not be influenced by the subscriber and should therefore not be charged to the subscriber given proper use.

The processing of the Internet traffic by the specific line/trunk group LTG-I allows the handling of the Internet traffic with an independent software package. As a result, undesired interactions with existing features of the switching center and a disproportional increase in the complexity of the software in the switching centers are avoided.

The configurations of the functional D-channel protocol are described below. This serves to facilitate an understanding of the possibilities of the protocol, particularly for the realization of the invention.

The functional protocol includes a sequence of functional information elements (FAC-IE). A functional information element, also referred to below as facility information element, requires a certain degree of intelligent processing by the terminal equipment or (customer premises equipment CPE) and the switching center to which the connection exists, namely both in generating and analyzing such information elements. A sequence of the information elements serves for the setup of the connections, i.e. of purely signalling relationships and, potentially, payload channel connections in the method described here.

Two categories of procedures are defined for the functional signalling of supplementary services.

The first category, referred to as the "separate messages" category, uses separate message types in order to indicate a desired function. The "HOLD" and "RETRIEVE" family of messages are included in this category.

The second category, referred to as the category of "common information elements", uses the facility information elements FAC-IE for the signalling of auxiliary services, but only for the signalling of auxiliary services that do not require any synchronization of resources between user and network.

The following terms, which are defined in CCITF. "Consultative Committee International Telephony and Telegraphy". Recommendation X.219, are employed for specifying procedures for the control of remote operations:
  remote operation
  operation classes
  connection-oriented transport mechanism
  connectionless transport mechanism,
  bearer related supplementary service procedure
  bearer independent supplementary service procedure.
Remote Operation
Procedures and Components:

The remote operation protocol for handling FAC-IEs includes the following procedures (means for sending and receiving messages):
  INVOCATION procedure
  RETURN_RESULT procedure
  RETURN_ERROR procedure
  REJECT procedure.

All necessary FAC-lEs for the processing of features are sent in a suitable D-channel message. The aforementioned procedures are the minimum pre-condition in order to set up and clear down connections by means of functional protocol.

The INVOCATION procedure is used in order to initiate an operation that is to be implemented by the other side. An operation is a matter of a part of a supplementary service, for example a feature.

The RETURN RESULT procedure is used in order to transmit the result (on the basis of an INVOCATION procedure) of a successfully implemented operation.

The RETURN ERROR procedure is used in order to transmit the ERROR information of an unsuccessfully implemented operation.

The REJECT procedure is used in order to reject the operation requested by the INVOCATION procedure or in order to reply.

Each of the procedures uses specific (message) components. The invoke, return result, return error and reject components are transported in facility information elements that are, in turn, sent in what are referred to as basic call control messages or in separate FACILITY messages between terminal equipment and switching center in order to set up or clear down signalling relationships and, potentially, payload channel connections.

The INVOCATION procedure thus uses the INVOKE component, the RETURN RESULT procedure uses the RETURN RESULT component, the RETURN ERROR procedure uses the RETURN ERROR component and the REJECT procedure uses the REJECT component.

The connection-oriented transport mechanism requires the establishment of a data link and a transport association between the service requester and the service provider. The mechanism allows procedures of the second category to be initiated wherein success and/or failure messages are required. The mechanism provides a call reference within the transport association that represents a means for the unambiguous association of the transport messages of a connection.

There is no transport association given the connectionless transport mechanism; rather, only a single transport message is respectively transmitted, whereby a dummy value is used as call reference. This mechanism allows the transfer of requests of operations about whose result no report ensues.
Supplementary Service Procedures that are Dependent on the Payload Connection.

This type of procedure is bound to procedures for the basic call control and to a payload connection that exists, is being set up or being cleared down. The call reference that is used by the basic call control procedure is adopted from the bearer connection-dependent INVOCATION procedures in order to correlate with the suitable transactions of the basic call control. The allocation between the respective application on the terminal equipment and the corresponding switching-oriented program or program status is thus achieved.

In transporting the components (dependent on the payload connection) the following two categories are defined:
1. Point-to-point transport mechanism and;
2. Broadcast transport mechanism.

Suitable Dchannel messages are used for the exchange of FAC-IEs. The transport procedures are bound to payload connections (connection setup, active phase of the connection, connection cleardown) that are identified by the call reference.

For example, the FAC-IEs are transported in FACILITY messages for the setup and cleardown of payload channel connections for the transmission of data bursts.
Supplementary Service Procedures that are Independent of the Payload Connection This type of procedure is independent of the procedures for the basic call control and is not correlated with a payload connection, i.e. not correlated with a B-channel. This procedures is ideally suited to set up a signalling relationship independent of the bearer channel and to implement potential entry and authentication methods without occupying an auxiliary channel, in order to occupy one or two bearer channels for the implementation of the data transmission only given an immediately impending data transmission by switching to the bearer related procedure.

Transporting, of the components (independently of the payload connection) defines the following four categories
1. Point-to-point, connectionless;
2. Broadcast, connectionless;
3. Point-to-point connection, connection-oriented;
4. Broadcast, connection-oriented.

The connectionless network protocol uses the "dummy" call reference. The FAC-IE is transported in a FACILITY message.

An example of the inventive method now follows that discloses the interworking of the bearer independent service procedure with a bearer related procedure.

a) An Internet connection that requires an authentication operation over the D-channel starts with a bearer independent service procedure, i.e. without B-channel occupation. This service procedure can be connectionless (e.g. without a defied signalling procedure) or connection-oriented;

b) The service procedure must be switched to a bearer related service procedure for seizing a B-channel for phases of the burst-like data transmission or for the request/delivery of B-channel-associated services, in that a call reference/bearer channel reference is requested in a facility message.

FIG. 4 shows the fundamental processing of an Internet request by the software of a switching center. The message sequence ensues according to the principles explained by FIGS. 3A–3C.

The terminal equipment generate/analyze the messages of the functional protocol for the request of D-channel connections or for the setup of connections via B-channels.

Although other modifications and changes may be suggested by those skilled in the art, it is the intention of the inventors to embody within the patent warranted hereon all changes and modifications as reasonably and properly come within the scope of their contribution to the art.

Function as Uplink:

After analysis of the functional messages (unpacking the messages) by the functional analysis software of the LTG of the switching center, the "Internet software" assumes the evaluation of the information and their processing (also, too, for the interworking with switching center-specific features).

Function as Downlink:

Given cleardown of B-channel connections, the "Internet software" assumes the call control. The functional protocol translator assumes the signalling-oriented handling of the messages.

What is claimed is:

1. A method for controlling connections in a communication network, comprising the steps of:

setting up a signaling connection between a subscriber of the communication network and a service access system based on a service connection request by the subscriber; and intermittently setting up a payload connection associated with the signaling connection between the service access system and the subscriber only when there is data traffic for a service and clearing down the payload connection after the data transmission, wherein the signaling connection and the payload connection are maintained simultaneously during the data transmission.

2. The method of claim 1, wherein the service is at least one of a voice or a data service.

3. The method of claim 1, further comprising the step of:

charging a service by the communication network for a time interval in which the signaling connection and the payload connection simultaneously exist for the service.

4. The method of claim 3, wherein the step of clearing down the payload connection does not occur immediately after the end of data transmission but occurs immediately before the expiration of the time interval already charged.

5. The method of claim 1, wherein the intermittently setting up of the payload connection occurs only given data traffic.

6. A method for controlling service connections in a communication network in order to support access to a service via the communication network, comprising the steps of:

initiating the setup of a service-related signaling connection between a subscriber and a service access system;

intermittently initiating the setup of a payload connection between the service access system and the subscriber associated with the signaling connection only when there is data traffic and initiating the cleardown of the payload connection after data transmission, wherein the signaling connection and the payload connection are maintained simultaneously during the data transmission.

7. The method of claim 6, wherein the service-related signaling connection is to a point of presence server of an Internet service provider over a D-channel.

8. The method of claim 6, wherein the payload connection is a B-channel connection.

9. The method of claim 6, further comprising charging for service by the service provider for each time interval in which the, payload connection is intermittently set up.

10. The method of claim 9, further comprising clearing down the payload connection after the end of data transmission and when the time interval has already been charged.

11. The method of claim 6, wherein the intermittently initiating the setup of the payload connection occurs only given data traffic.

12. The method of claim 6, wherein the intermittently initiating the setup of the payload connection occurs only given data traffic.

* * * * *